(12) United States Patent
Cociglio et al.

(10) Patent No.: US 11,784,895 B2
(45) Date of Patent: Oct. 10, 2023

(54) PERFORMANCE MEASUREMENT IN A PACKET-SWITCHED COMMUNICATION NETWORK

(71) Applicant: TELECOM ITALIA S.p.A., Milan (IT)

(72) Inventors: Mauro Cociglio, Turin (IT); Giuseppe Fioccola, Naples (IT)

(73) Assignee: TELECOM ITALIA S.p.A., Milan (IT)

( * ) Notice: Subject to any disclaimer, the term of this patent is extended or adjusted under 35 U.S.C. 154(b) by 323 days.

(21) Appl. No.: 17/298,716

(22) PCT Filed: Dec. 2, 2019

(86) PCT No.: PCT/EP2019/083318
§ 371 (c)(1),
(2) Date: Jun. 1, 2021

(87) PCT Pub. No.: WO2020/114971
PCT Pub. Date: Jun. 11, 2020

(65) Prior Publication Data
US 2022/0029898 A1    Jan. 27, 2022

(30) Foreign Application Priority Data
Dec. 4, 2018    (IT) .................. 102018000010791

(51) Int. Cl.
*H04L 43/022* (2022.01)
*H04L 43/0829* (2022.01)

(52) U.S. Cl.
CPC ........ *H04L 43/022* (2013.01); *H04L 43/0829* (2013.01)

(58) Field of Classification Search
CPC ... H04L 43/022; H04L 43/0829; H04L 1/203; H04L 43/026; H04L 43/10; H04L 43/12; H04L 1/205
See application file for complete search history.

(56) References Cited

U.S. PATENT DOCUMENTS

| 6,978,223 B2 | 12/2005 | Milliken |
| 9,537,734 B2 | 1/2017 | Paek et al. |
| (Continued) | | |

FOREIGN PATENT DOCUMENTS

| CN | 1645825 A | 7/2005 |
| WO | WO 2007/118396 A1 | 10/2007 |
| (Continued) | | |

OTHER PUBLICATIONS

Indian Office Action dated Jan. 20, 2023 in Indian Patent Application No. 202117026398, 8 pages.
(Continued)

*Primary Examiner* — Afshawn M Towfighi
(74) *Attorney, Agent, or Firm* — Oblon, McClelland, Maier & Neustadt, L.L.P.

(57) ABSTRACT

A method for performing a performance measurement in a communication network. Each measurement point in the network identifies packets of a multipoint packet flow and selects therefrom a number of samples, based on the value of a sampling signature calculated by applying a hash function to a bit mask in each identified packet. For each sample, a performance parameter and the packet's content are provided to a management server. The management server identifies a cluster of measurement points such that each identified packet of the multipoint packet flow received by a cluster's input measurement point is also received at a cluster's output measurement point. Amongst the performance parameters provided by the cluster's measurement points, the performance parameters relating to samples (Continued)

belonging to a certain packet sub-flow are identified, based on the packet's content. Then, a performance measurement is performed on the packet sub-flow.

11 Claims, 4 Drawing Sheets

(56) References Cited

U.S. PATENT DOCUMENTS

| | | | |
|---|---|---|---|
| 9,596,167 B1* | 3/2017 | Jacob | H04L 41/5009 |
| 2015/0207712 A1* | 7/2015 | Fang | H04L 43/0852 |
| | | | 370/252 |
| 2019/0349279 A1 | 11/2019 | Fang et al. | |
| 2023/0087379 A1* | 3/2023 | Cociglio | H04L 43/0829 |

FOREIGN PATENT DOCUMENTS

| | | |
|---|---|---|
| WO | WO 2010/072251 A1 | 7/2010 |
| WO | WO 2017/071779 A1 | 5/2017 |
| WO | WO 2017/186302 A1 | 11/2017 |
| WO | WO 2018/072828 A1 | 4/2018 |

OTHER PUBLICATIONS

International Search Report dated Jan. 17, 2020 in PCT/EP2019/083318 filed Dec. 2, 2019.

Zseby, T., et al., "Sampling and Filtering Techniques for IP Packet Selection", Network Working Group, XP015065544, 2009, 46 total pages.

* cited by examiner

PERFORMANCE MEASUREMENT IN A PACKET-SWITCHED COMMUNICATION NETWORK

TECHNICAL FIELD

The present invention relates to the field of communication networks. In particular, the present invention relates to a method for performing a performance measurement in a packet-switched communication network. Further, the present invention relates to a communication network configured to implement such method.

BACKGROUND ART

In a packet-switched communication network, packet flows are transmitted from source nodes to destination nodes through possible intermediate nodes. Exemplary packet-switched networks are IP (Internet Protocol) networks, Ethernet networks and MPLS (Multi-Protocol Label Switching) networks.

Packets not always reach their destination nodes, i.e. they may be lost during transmission through the network. Packet loss is due to different reasons. For instance, a node or link may fail, or packets may be discarded by a node due to a congestion of its ports. Besides, packets may be discarded by a node since they contain bit errors.

Moreover, each packet is transmitted at a transmission time by the source node and is received at a reception time by the destination node (if it is not lost). The time elapsing between transmission time and reception time is typically called "one-way delay". The one-way delay of a packet mainly depends on the number of possible intermediate nodes crossed by the packet from source to destination, the permanence time of the packet at each node and the propagation time along the links.

Furthermore, packets may have different one-way delays. The difference between the one-way delays of two packets of a same packet flow is termed "interarrival jitter" (or, briefly, "jitter").

When a communication service (in particular, a real-time voice or data service such as call, conference call, video conference, etc.) is provided by means of a packet-switched network, a performance measurement in terms of packet loss, one-way delay and jitter on packet flows carrying the service provides an indication of the quality of service (QoS) perceived by the end users of the service. In addition, packet loss and high delay/jitter may require retransmission and then reduce the efficiency of the communication network. Therefore, measuring packet loss, one-way delay and/or jitter of packet flows in a communication network is of particular interest for network operators.

WO 2010/072251 in the name of the same Applicant discloses a method for measuring packet loss of a packet flow transmitted from a transmitting node to a receiving node, that uses an alternate marking technique. The packet flow is a point-to-point packet flow whose packets follow a same path between transmitting node and receiving node.

WO 2017/186302 in the name of the same Applicant discloses a method for performing a performance measurement on a multipoint packet flow whose packets follow two or more at least partially non overlapping end-to-end paths through the network. All the packets of the multipoint packet flow are subjected to alternate marking by the respective source nodes. A plurality of measurement points is implemented in the subnetwork supporting transmission of the multipoint packet flow. Each measurement point provides performance parameters (e.g. counters) relating to the received packets. In order to provide a performance measurement, a cluster is identified, namely a set of measurement points which exhibits the property that the ensemble of the packets received at the input measurement points of the cluster is the same as the ensemble of the packets received at the output measurement points of the cluster, if no packet loss occurs. The performance parameters provided by all the input and output measurement points of the cluster are then combined to provide a performance measurement of the multipoint packet flow in the cluster.

SUMMARY OF THE INVENTION

The Applicant has noticed that the implementation of the performance measurement of WO 2010/072251 at the nodes of a communication network may exhibit scalability issues, when the number of packet flows to be measured increases. In order to identify the packets of each packet flow to be measured, indeed, each node shall be configured with a suitable filter capable of discriminating packets belonging to the desired packet flow from packets not belonging to it. In order to identify a specific point-to-point packet flow (e.g. carrying a certain specific service, e.g. a voice service), the filter shall be based on several fields of the packet's header (source address, destination address, etc.) and is therefore quite complex. Implementing several filters (e.g. 1000 or more) of this type at the nodes of the communication network in order to identify corresponding packet flows to be measured is extremely costly and, in some cases, practically unfeasible.

Conversely, according to the technique of WO 2017/186302 the identification of all the packets of the multipoint packet flow could require a single filter or a small number of filters, each filter being moreover much simpler than any filter needed to identify the packets of a single point-to-point packet flow. For example, all the packets of a multipoint packet flow may be identified based on a single header field, e.g. the source address. However, the performance measurement provided by WO 2017/186302 are indicative of the behaviour of the whole multipoint packet flow within the selected cluster. If a network operator wishes to obtain a performance measurement on a portion only of the multipoint packet flow—e.g. on a single point-to-point packet flow comprised in the multipoint packet flow and carrying a certain specific service (e.g. a voice service)—it can not extrapolate such measurement from the performance parameters provided by the measurement points of the cluster.

In view of the above, the Applicant has tackled the problem of providing a method for performing a performance measurement in a packet-switched communication network, which overcomes the aforesaid drawbacks.

In particular, the Applicant has tackled the problem of providing a method for performing a performance measurement in a packet-switched communication network, which allows a network operator to obtain performance measurements relating to any desired portion (e.g. any point-to-point packet flow) of a multipoint packet flow, without requiring the implementation of complex and costly filters at the nodes of the communication network.

In the present description and in the claims, the expression "multipoint packet flow" will designate a packet flow comprising packets which are transmitted along two, or more, at least partially non overlapping end-to-end paths, so that different packets of the multipoint packet flow may be received at different measurement points implemented along those paths. For instance, a multipoint packet flow may comprise two or more point-to-point packet flows with different source nodes and/or different destination nodes. Alternatively or in addition, a multipoint packet flow may comprise a point-to-point packet flow whose packets, e.g. due to a load balancing algorithm, are transmitted from a same source node to a same destination node via different intermediate nodes.

Further, in the present description and in the claims, the expression "packet sub-flow" will designate an arbitrary portion of the multipoint packet flow, which may comprise a single point-to-point packet flow of the multipoint packet flow or the aggregation of two or more point-to-point packet flows of the multipoint packet flow (with the exclusion of the aggregation of all the point-to-point packet flows of the multipoint packet flows).

Further, in the following description and in the claims, the expression "performing a performance measurement on a packet flow" will designate an operation of measuring:

a one-way delay, a two-way delay or a jitter induced on packets of said packet flow by transmission between the two measurement points; and/or a packet loss induced on packets of said packet flow by transmission between the two measurement points.

Further, in the present description and in the claims, the expression "packet's content" will designate the ensemble of the content of its header and the content of its payload.

According to embodiments of the present invention, the above problem is solved by a method for performing a performance measurement in a communication network wherein each measurement point of a number of measurement points implemented in the communication network identifies packets of a multipoint packet flow and selects therefrom a number of sample packets, based on the value of a sampling signature calculated by applying a hash function to a predetermined mask of bits in each identified packet. Then, for each sample packet, each measurement point provides to a management server a sample performance parameter and at least a portion of the packet's content (by way of non limiting example, at least a portion of its header). In order to provide a performance measurement, the management server identifies a cluster of measurement points wherein, if no packet loss occurs, each identified packet of the multipoint packet flow received by an input measurement point of the cluster is also received at an output measurement point of the cluster. Then, amongst the sample performance parameters provided by the measurement points of the cluster, the management server identifies the sample performance parameters relating to sample packets belonging to a certain packet sub-flow comprised in the multipoint packet flow, based on the at least a portion of said packet's content. The management server then performs the performance measurement on the packet sub-flow, based on the identified sample performance parameters.

Therefore, advantageously, by processing the content portions of the sample packets received from the measurement points (by way of non limiting example, the headers of the sample packets), the management server may, at any time, provide an off-line or a posteriori performance measurement on the sample packets of any packet sub-flow comprised in the multipoint packet flow. Having at its disposal the headers of the sample packets, for example, the management server may apply an off-line filtering to the sample packets' headers based on several header fields, thereby extrapolating—amongst all the performance parameters relating to the sample packets of the multipoint packet flow—only those that relate to a specific packet sub-flow comprised in the multipoint packet flow. Such off-line filtering may be done for every one of the packet sub-flows forming the multipoint packet flow and with any desired granularity, by suitably changing the filtering criteria. For instance, in a scenario where several services carried by respective point-to-point packet flows are present, the network operator is advantageously provided with the capability of obtaining separate performance measurements for each one of the services provided.

In this respect, it shall be noticed that use of the hash sampling signature in combination with the properties of the cluster guarantees that a sample packet identified by an input measurement point of the cluster is received and correctly identified as sample packet also at an output measurement point of the cluster (provided it is not lost during transmission through the cluster), and then that the performance parameters provided to the management server are consistent with each other. The management server therefore has at its disposal a database of commensurable and consistent sample performance parameters (with the respective packet headers, for example), which the management server may subject to off-line filtering as described above for extrapolating the performance measurement for any desired packet sub-flow.

Furthermore, advantageously, no complex and costly filters have to be implemented at the measurement points of the communication network. The measurement points indeed cumulatively identify all the packets forming the multipoint packet flow, which may be done using a very simple filter, e.g. based on a single field of the packet's header. The more complex filters allowing identification of the sample performance parameters relating to sample packets of any desired packet sub-flow are instead applied by the management server, which therefore has in charge most of the computational effort needed to identify the single packet sub-flows.

According to a first aspect, the present invention provides a method for performing a performance measurement in a communication network, the method comprising, at each measurement point of a number of measurement points implemented in the communication network a) identifying packets of a multipoint packet flow;

b) amongst the identified packets of the multipoint packet flow, selecting a number of sample packets, the selecting being based on the value of a sampling signature calculated by applying a hash function to a predetermined mask of bits in each identified packet;

c) for each sample packet, providing to a management server a sample performance parameter and at least a portion of the packet's content;

the method further comprising, at the management server:

d) amongst the number of measurement points, identifying a cluster of measurement points wherein, if no packet loss occurs, each identified packet of the multipoint packet flow received by an input measurement point of the cluster is also received at an output measurement point of the cluster;

e) amongst the sample performance parameters provided by the measurement points of the cluster, identifying sample performance parameters relating to sample packets belonging to a packet sub-flow comprised in the multipoint packet flow, based on the at least a portion of the packet's content; and f) performing the performance measurement on the packet sub-flow, based on the identified sample performance parameters.

Preferably, the packets of a multipoint packet flow are marked before they are injected in the communication network, the marking comprising setting the value of a marking field comprised in each packet of the multipoint packet flow to one of at least two alternative marking values and cyclically switching the value of the marking field with a marking period Tm.

Preferably, at step c) the at least a portion of the packet's content comprises at least a portion of the packet's header comprising at least one identification field of the packet sub-flow, other than one or more identification fields used at step a) for identifying the multipoint packet flow.

In addition or alternatively, at step c) the at least a portion of the packet's content comprises at least a portion of the packet's payload comprising at least one identification field of the packet sub-flow, other than one or more identification fields used at step a) for identifying the multipoint packet flow.

Preferably, upon reception of the sample performance parameter and the at least a portion of the packet's content at the management server, the sample performance parameter and the at least a portion of the packet's content are stored in a database.

Preferably, steps d), e) and f) are performed off-line after the storing, upon occurrence of an event detected by the management server.

Preferably, at step e) identifying the sample performance parameters relating to sample packets belonging to the packet sub-flow comprises:
  determining at least one identification field comprised in the at least a portion of the packet's content whose value identifies the packet sub-flow;
  reading in the database the at least a portion of packet's content that accompanies each stored sample performance parameter and, if it comprises the value identifying the packet sub-flow in the at least one identification field, retrieving the corresponding sample performance parameter from the database.

According to a variant:
  step c) comprises, for each sample packet, providing to the management server also an identifier of the sample packet; and
  step f) comprises, based on the identifiers, identifying sample performance parameters relating to a same sample packet and provided by different measurement points of the cluster.

Optionally, the method further comprises, after step a), updating a cumulative performance parameter indicative of the behaviour of the multipoint packet flow as a whole and step f) comprises also providing a cumulative performance measurement based on the cumulative performance parameters received from the measurement points of the cluster.

Preferably, the cumulative performance measurement are performed by the management server substantially in real time.

According to a second aspect, the present invention provides a system for performing a performance measurement in a communication network, the system comprising a number of measurement points implemented in the communication network and a management server, wherein each measurement point is configured to:
a) identify packets of a multipoint packet flow;
b) amongst the identified packets of the multipoint packet flow, select a number of sample packets, the selection being based on the value of a sampling signature calculated by applying a hash function to a predetermined mask of bits in each identified packet;
c) for each sample packet, provide to the management server a sample performance parameter and at least a portion of the packet's content;
and wherein the management server is configured to:
d) amongst the number of measurement points, identify a cluster of measurement points wherein, if no packet loss occurs, each identified packet of the multipoint packet flow received by an input measurement point of the cluster is also received at an output measurement point of the cluster;
e) amongst the sample performance parameters provided by the measurement points of the cluster, identify sample performance parameters relating to sample packets belonging to a packet sub-flow comprised in the multipoint packet flow, based on the at least a portion of the packet's content; and
f) perform the performance measurement on the packet sub-flow, based on said identified sample performance parameters.

BRIEF DESCRIPTION OF THE DRAWINGS

The present invention will become clearer from the following detailed description, given by way of example and not of limitation, to be read with reference to the accompanying drawings, wherein.

DETAILED DESCRIPTION OF PREFERRED EMBODIMENTS OF THE INVENTION

Figure 1:
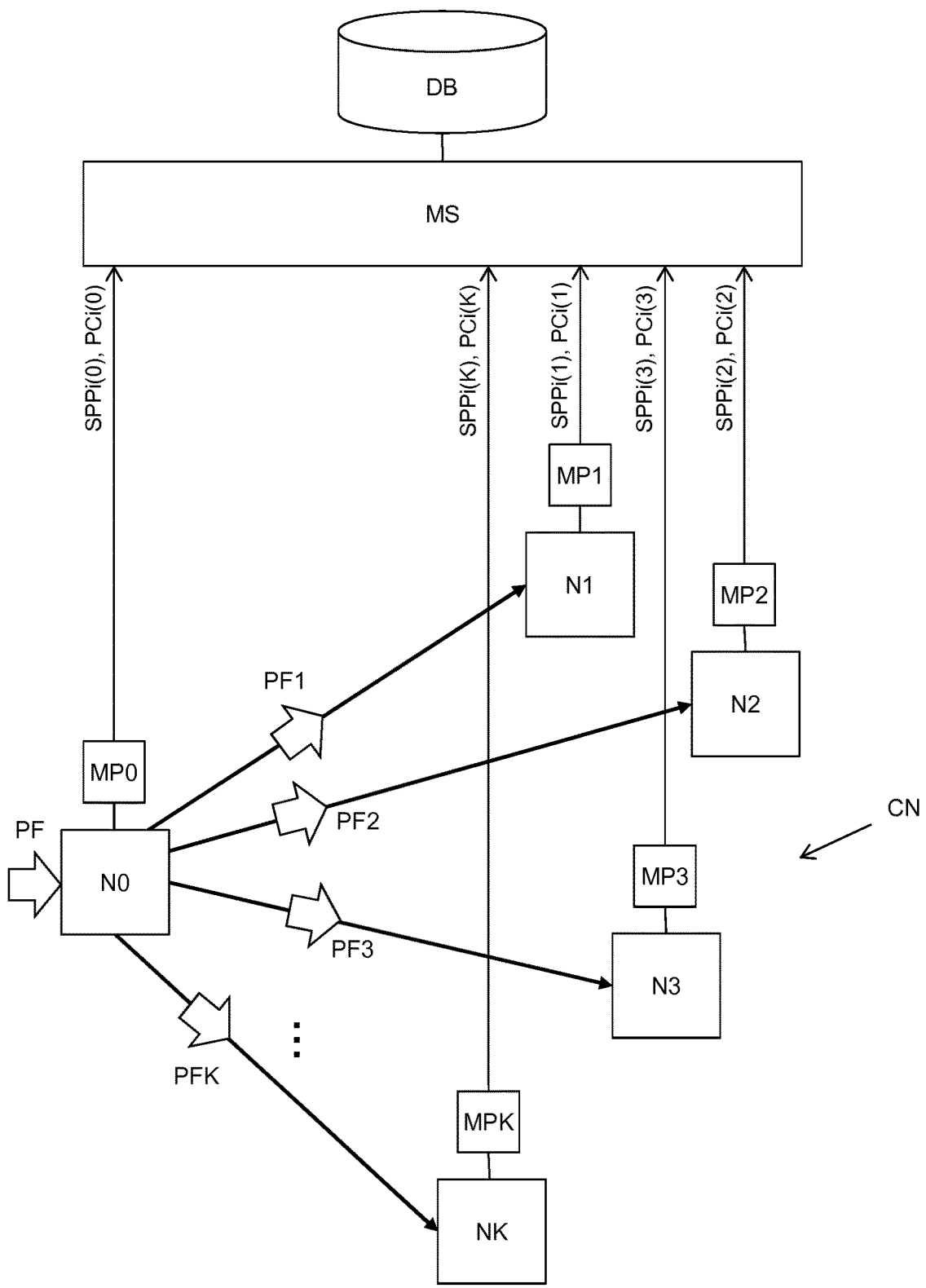
FIG. 1 schematically shows an exemplary communication network supporting transmission of a multipoint packet flow.

FIG. 1 schematically shows a portion of an exemplary packet-switched communication network CN in which the method for performing a performance measurement according to embodiments of the present invention is implemented. The packet-switched communication network CN may be an IP network or any other type of packet-switched network (e.g. MPLS or Ethernet).

The packet-switched communication network CN comprises a plurality of nodes reciprocally interconnected by links according to any known topology. In particular, the network CN comprises nodes N0, N1, N2, N3, . . . NK (with K integer and higher than 2, preferably higher than 10, for example 100, 500, 1000 or 5000) which, by way of non limiting example, are reciprocally interconnected according to a tree topology. In particular, node N0 is connected to each one of nodes N1, N2, N3, . . . NK. The link between the node N0 and each node N1, N2, N3, . . . NK may be a direct link or may comprise one or more intermediate nodes, which for simplicity are not shown in FIG. 1.

The communication network CN supports transmission of a multipoint packet flow PF. The multipoint packet flow PF may comprise several packet sub-flows, for example several point-to-point packet flows originated by N=1 source node and addressed to M>1 destination nodes. This is the case of the exemplary scenario depicted in FIG. 1, where the packet flow PF comprises K point-to-point packet flows PF1, PF2, PF3, ... PFk having N=1 source node N0 and M=K destination nodes N1, N2, N3, ... NK. In particular, according to the exemplary scenario of FIG. 1 the multipoint packet flow PF as a whole is injected in the communication network CN via the node N0 and is then split, such that each point-to-point packet flow PF1, PF2, PF3, ... PFK reaches a respective destination node N1, N2, N3, ... NK.

The scenario of FIG. 1 is not limiting. The multipoint packet flow PF may have N>1 source nodes and M=1 destination node. Alternatively, the multipoint packet flow may have N>1 source nodes and M>1 destination nodes. In this case, the multipoint packet flow PF may have few source nodes and several destination nodes, namely N<<M. This is the case e.g. of multipoint packet flows carrying traffic of an OTT internet service in the downstream direction, namely from few OTT servers to multiple end users, or those carrying LTE (Long Term Evolution) traffic in the downstream direction, namely from few packet gateways to several eNodeBs. Alternatively, the multipoint packet flow PF may have several source nodes and few destination nodes, namely N>>M. This is the case e.g. of multipoint packet flows carrying traffic of an OTT internet service in the upstream direction, namely from multiple end users to few OTT servers, or those carrying LTE traffic in the upstream direction, namely from several eNodeBs to few packet gateways.

Figure 2:
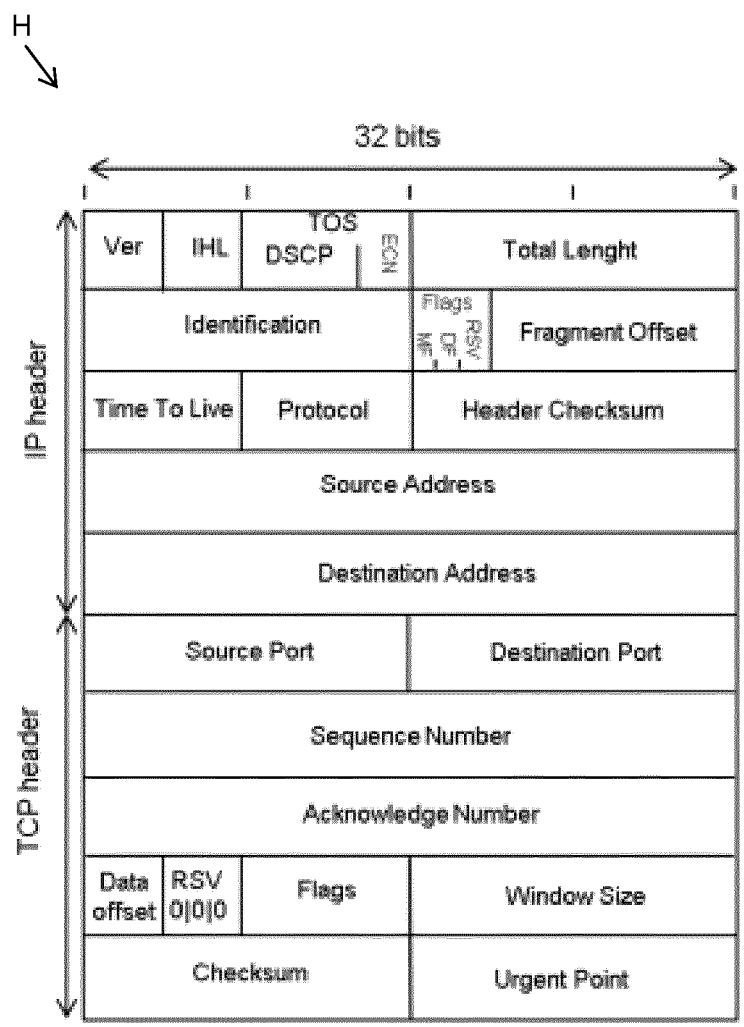
FIG. 2 shows the structure of the header of an IP packet.

Preferably, each packet of the multipoint packet flow PF comprises a header and a payload. Preferably, the header comprises information that the nodes of the communication network CN use for routing the packet. The header format depends on the protocol according to which the packets are formatted. By way of non limiting example, FIG. 2 shows the header H of a packet formatted according to the known TCP (Transmission Control Protocol) over IPv4 (Internet Protocol Version 4). The header H comprises 40 bytes divided into 20 bytes for the IP header and 20 bytes for the TCP header.

Preferably, the multipoint packet flow PF is defined (and hence distinguishable amongst all the traffic transmitted in the communication network CN) by one or more values of one or more of the above header fields, which are termed herein after "identification fields". In particular, in case of IPv4 protocol, the identification fields may comprise one or more of: Source Address, Destination Address, Protocol and DSCP of the IP header and Source Port and Destination Port of the TCP header. By suitably selecting the identification fields and their values, different types of multipoint packet flows may be defined.

For instance, the multipoint packet flow PF of the scenario shown in FIG. 1 may be defined by a single value of the Source Address field (namely, the IP address of host devices directly or indirectly connected to the source node N1). In general, defining a multipoint packet flow by a single value of the Source Address field results in a multipoint packet flow having N=1 source node (as PF in FIG. 1), while defining a multipoint packet flow by a single value of the Destination Address field results in a multipoint packet flow having M=1 destination node.

Preferably, a plurality of measurement points are implemented in the communication network CN. Each measurement point may be either embedded within a respective node, or implemented as a stand-alone machine connected to a respective node. For instance, with reference to FIG. 1, a measurement point MP0 is implemented at the node N0 (in particular on its input interface though which the packet flow PF is injected in the communication network CN) while measurement points MP1, MP2, MP3, ... MPK are implemented at the nodes N1, N2, N3, ... NK (for example, at their input interfaces through which they receive the respective point-to-point packet flow PF1, PF2, PF3, ... PFK).

Preferably, the communication network CN is also provided with a management server MS, which may be for example a SDN (Software Defined Network) controller or a dedicated server for big data analytics. The management server MS preferably cooperates with the measurement points MP0, MP1, MP2, MP3, ... MPK and with a database DB for storing information gathered from the measurement points MP0, MP1, MP2, MP3, ... MPK.

According to preferred embodiments of the present invention, the packets of the multipoint packet flow PF are marked before they are injected in the communication network CN. For instance, with reference to the scenario of FIG. 1, the packets of the multipoint packet flow PF may be marked at the node N0 or before they reach the node N0.

For marking purposes, each packet of the multipoint packet flow PF preferably includes a marking field MF comprising at least one bit, whose value is set to one of at least two alternative marking values MA, MB. The marking field MF is preferably comprised in the packet header H. The marking field MF may be for instance a field to which the protocol according to which the packet is formatted has not assigned a specific function yet. Alternatively, the marking field MF may be comprised in a field having other uses. For instance, in case of IP packets (see FIG. 2), the marking field MF may comprise one bit of the 8-bit TOS (Type of Service) field or the RSV bit of the Flags field, and its two alternative marking values MA and MB may be 1 and 0, respectively.

The value of the marking field MF is alternately (e.g., periodically) switched between MA and MB with a period Tm, which will be termed herein after "marking period". The marking period Tm may be set by the network operator, according to the desired time measurement rate (as it will be described in detail herein after, the marking period Tm is also related to the measurement period). For instance, the marking period Tm may be equal to 5 minutes. The marking period Tm may be non-constant, i.e., the switching of the marking value between the at least two values MA, MB may occur with a non periodic rate, such as in case of alternate marking that is influenced by network related events.

If, differently from the scenario shown in FIG. 1, the K point-to-point packet flows PF1, PF2, PF3, ... PFK have different source nodes, the marking of all the K point-to-point packet flows PF1, PF2, PF3, ... PFK of the multipoint packet flow PF is preferably substantially synchronized, namely the marking value is changed substantially at the same time (i.e. with a maximum mismatch of Tm/2) for all the K point-to-point packet flows of the multipoint packet flow PF. This way, the packets of the multipoint packet flow PF which are transmitted during a certain marking period are substantially all marked with a same marking value MA or MB.

Figure 3:
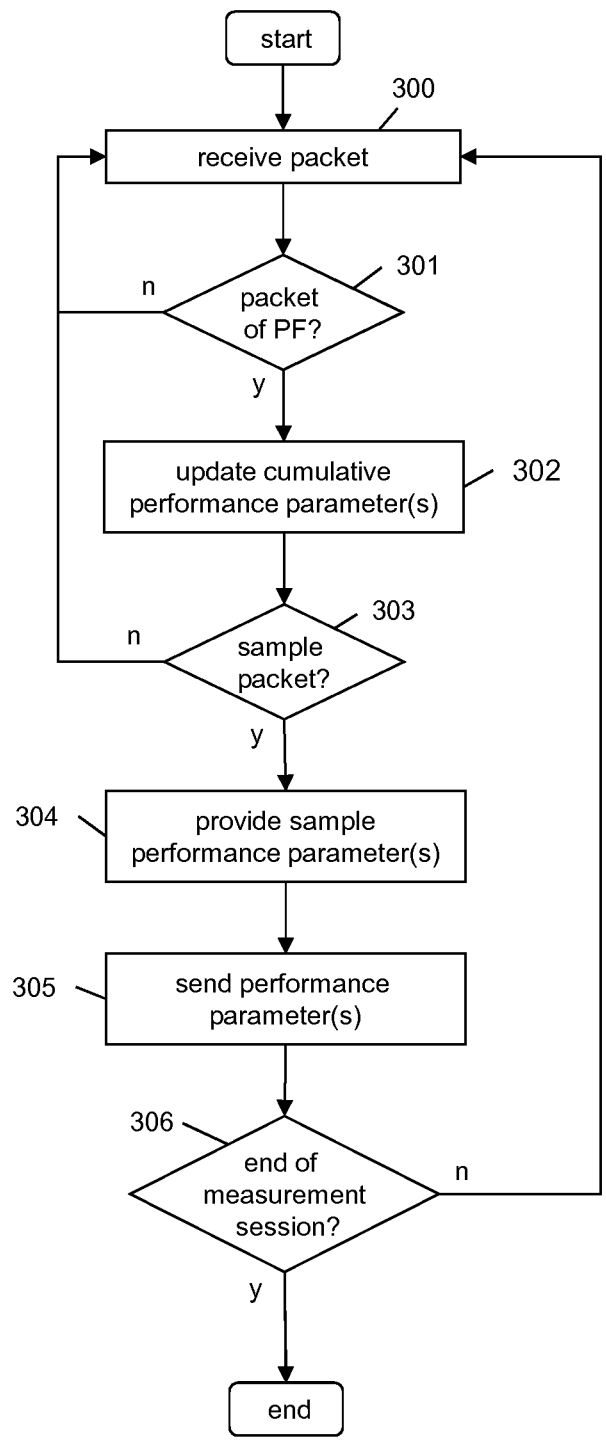
FIG. 3 is a flow chart showing operation of a measurement point according to an embodiment of the present invention.

The behaviour of each measurement point MP0, MP1, MP2, MP3, ... MPK (also generically indicated as MPk with k=0, 1, 2, 3, ... K in the following description) according to an embodiment of the invention will be now described in detail with reference to the flow chart of FIG. 3.

During each marking period, each measurement point MPk receives all the traffic (or a copy thereof) received at the respective node (step 300).

The measurement point MPk then filters all the incoming traffic, in order to identify the packets of the multipoint packet flow PF (step 301). In order to perform the filtering step 301, the measurement point MPk preferably reads the value(s) of the identification field(s) comprised in the header H of each received packet and checks whether it is (they are) equal to that one or those ones which define the multipoint packet flow PF as described above. Assuming that the packet flow PF shown in the exemplary scenario of FIG. 1 is defined by the value of the IP address of the source node N0, at step 301 each measurement point MPk preferably checks whether the Source Address of each incoming packet is equal to such value. It may be appreciated that the filtering performed at step 301 requires implementation of a same, very broad and simple filter at each one of the measurement points MPk.

Then, optionally each measurement point MPk updates a cumulative performance parameter indicative of the behaviour of the multipoint packet flow PF as a whole (step 302). In particular, each measurement point MPk preferably implements a couple of cumulative performance parameters $CPP(k)^A$, $CPP(k)^B$, one relating to packets marked by MA and one relating to packets marked by MB. Such couple of cumulative performance parameters $CPP(k)^A$, $CPP(k)^B$ may comprise, for instance:

- a couple of counters $CC(k)^A$, $CC(k)^B$ counting the number of identified packets of the packet flow PF marked by MA and MB, respectively; and/or
- a couple of average timestamps $AT(k)^A$, $AT(k)^B$ indicating the average reception times, at the measurement point MPk, of the identified packets of the packet flow PF marked by MA and MB, respectively.

Since—during each marking period—only packets with a same marking value MA or MB are transmitted, iterations of step 302 during marking periods wherein packets are marked by MA result in the cumulative performance parameter $CPP(k)^A$ being updated and the cumulative performance parameter $CPP(k)^B$ being instead idle, namely having a value constantly equal to that reached at the end of the preceding marking period. Conversely, iterations of step 302 during marking periods wherein packets are marked by MB result in the cumulative performance parameter $CPP(k)^B$ being updated and the cumulative performance parameter $CPP(k)^A$ being instead idle.

Then, amongst the packets of the multipoint packet flow PF as identified at step 301, each measurement point MPk preferably identifies a number of sample packets based on the value of a sampling signature SS calculated for each packet of the packet flow PF as identified at step 301 (step 303). The sampling signature SS is preferably calculated by applying a hash function to a predetermined mask of bits in the packet, preferably in the packet header H.

According to a preferred embodiment, at each measurement point MPk the identification of the sample packets based on the sampling signature SS is carried out according to WO 2018/072828 in the name of the same Applicant. In brief, for each packet identified at step 301 each measurement point MPk preferably calculates a sampling signature SS of $S_{max}$ bits (e.g. $S_{max}$=32). Then, the measurement point MPk identifies the sample packets as those whose sampling signatures SS comprise a portion of S bits (e.g. the S most significant bits) equal to a certain sampling value $H_S{}^*$. The unused hash of $S_{max}$-S bits is stored by the measurement point MPk and will be used for uniquely identifying the sample packet, as it will be described in detail herein after. Optionally, while the measurement point MPk is performing the sample selection, it counts the number of selected sample packets and retroactively adjusts the length S of the sampling signature portion used for selecting the sample packets, based on this number.

According to other embodiments, at each measurement point MPk the identification of the sample packets based on the sampling signature SS is carried out according to WO 2017/071779 in the name of the same Applicant. In this case, the sampling signature is calculated by applying a hash function to a certain mask of bits in each sample packet and has a fixed length S and, in order to uniquely identify each sample packet, an identification signature is used, which each measurement point MPk calculates by applying a further hash function to a further mask of bits in each sample packet.

Preferably, all the measurement points MP0, MP1, MP2, MP3, . . . MPK use a same mask of bits, a same hash function and a same sampling value (or corresponding sampling values, if each measurement point MPk has the capability of adjusting the length S of the sampling signature portion to be used for selecting the sample packets) as a discriminant for determining whether a packet is a sample packet or not. Hence, if a same packet of the multipoint PF is intercepted by two measurement points, both measurement points will also select it as a sample packet.

Then, upon identification of each measurement sample, each measurement point MPk preferably provides a sample performance parameter SPPi(k) relating thereto (step 304), i being a sample index. For instance, at step 304 each measurement point MPk may provide a sample timestamp STi(k) indicating the time at which the sample packet has been received by the measurement point MPk.

Preferably, at step 304 each measurement point MPk associates to each sample performance parameter SPPi(k) one or more of:

- the sampling signature SS of the sample packet as calculated at step 303 or, at least, the unused hash of the sampling signature SS, namely the least significant $S_{max}$-S bits of the sampling signature SS which have not be used for selecting the sample packets at step 303;
- the identification field(s) used at step 301, which identify the multipoint packet flow PF (this information is therefore the same for all the sample performance parameters STi(k) provided by all the measurement points);
- an identifier of the measurement point Mk; and
- an identifier of the marking period Tm during which the sample packet has been identified (for example, the start time of the marking period Tm as detected by the measurement point MPk as a change in the marking value MA, MB of the received packets).

In addition to this information, according to embodiments of the present invention, each sample performance parameter SPPi(k) is also associated with a portion of the sample packet's content PCi(k), which comprises information allowing to distinguish sample packets comprised in different packet sub-flows of the multipoint packet flow PF.

For example, the portion of the sample packet's content PCi(k) accompanying the sample performance parameter SPPi(k) provided by the measurement point MPk may comprise the packet's header H or, at least, a portion of the packet's header H which comprises one or more identification fields other than the one(s) used at step 301 for identifying the packets of the multipoint packet flow PF. For instance, if the multipoint packet flow PF is identified by the Source Address field (in particular, the IP address of the node N0, in the exemplary scenario of FIG. 1), then the portion of packet's content PCi(k) which is associated with the sample performance parameter SPPi(k) relating to a sample packet may comprise at least the Destination Address field of its header. This way, sample performance parameters SPPi(k) relating to sample packets of each point-to-point packet flow PF1, PF2, PF3, . . . PFK are accompanied by respective values of the Destination Address field, namely the IP addresses of the nodes N1, N2, N3, . . . NK.

This is a non limiting example. According to other embodiments, for instance, the portion of the sample packet's content PCi(k) associated with the sample performance parameter SPPi(k) relating to a certain sample packet may comprise at least a portion of the packet's payload or the whole packet. This may be useful for example, if the packets of the multipoint packet flow PF are formatted according to several stacked protocols. In this case, the header H of the packet corresponds to the lowest layer protocol, while the most significant part of the payload comprises the headers of the higher layer protocols. The portion of packet's content PCi(k) associated with the sample performance parameter SPPi(k) of a sample packet may thus comprise the most significant part of the payload comprising the headers of the higher layer protocols.

Preferably, at step 304 each measurement point MPk locally stores the sample performance parameters SPPi(k) and the information associated with each performance parameter SPPi(k), e.g. in a local temporary memory or buffer.

Then, each measurement point MPk preferably sends to the management server MS both the cumulative performance parameter(s) $CPP(k)^A$, $CPP(k)^B$ and the sample performance parameters SPPi(k) (step 305).

As far as the cumulative performance parameter(s) $CPP(k)^A$, $CPP(k)^B$ is concerned, as described above, due to application of the alternate marking to the packets of the multipoint packet flow PF, during each marking period Tm one of the cumulative performance parameters (e.g. $CPP(k)^A$) is running while the other one (e.g. $CPP(k)^B$) is idle. Then, at the end of each marking period, each measurement point MPk preferably sends to the management server MS the value(s) of the currently idle cumulative performance parameter(s).

As far as the sample performance parameters is concerned, preferably, at the end of each marking period Tm each measurement point MPk preferably sends to the management server MS a number of $n_k$ sample performance parameters SPPi(k) (i=1, 2, . . . $n_k$) relating to the $n_k$ sample packets that have been identified at the iterations of step 303 which were performed during that marking period. For example, according to an embodiment, at step 305 each measurement point MPk preferably sends to the management server MS a sequence of $n_k$ sample timestamps STi(k) (i=1, 2, . . . $n_k$).

Preferably, each sample performance parameter STi(k) sent to the management server MS is accompanied by the respective portion of packet's content PCi(k) and possibly the other accompanying information as described above.

All the cumulative performance parameters $CC(k)^A$, $CC(k)^B$ and the sample performance parameters SPPi(k) with the respective portion of packet's content PCi(k) and possibly the other accompanying information as described above are received at the management server MS, which preferably stores them in the database DB.

Steps 300-305 are iterated by each measurement point MPk, until the measurement session ends (step 306).

Then, the management server MS may use the information stored in the database DB for providing performance measurements relating to the multipoint packet flow PF and the K point-to-point packet flows PF1, PF2, PF3, . . . PFK comprised therein.

Figure 4:
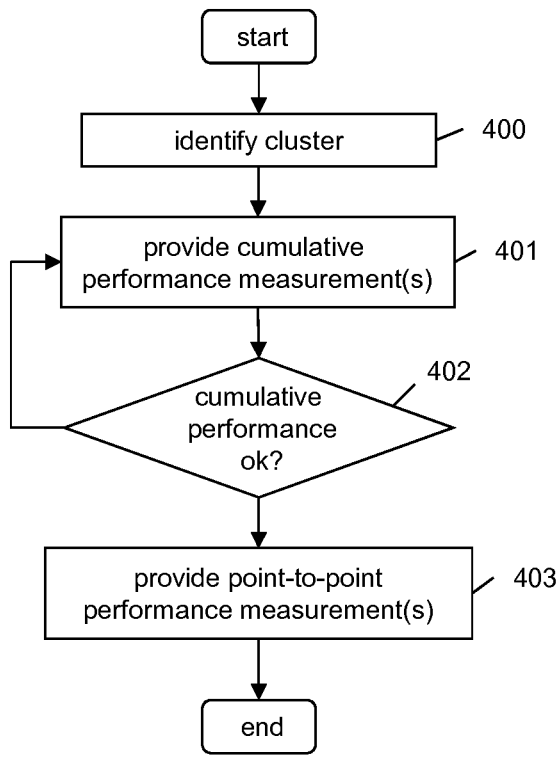
FIG. 4 is a flow chart showing operation of the management server, according to an embodiment of the present invention.

With reference to the flow chart of FIG. 4, in order to provide a performance measurement on the multipoint packet flow PF, the management server MS first of all preferably identifies at least one cluster of measurement points amongst all the measurement points deployed in the communication network CN and from which it receives cumulative and/or sample performance parameters (step 400). A cluster is preferably defined as a set of measurement points which exhibits the property that the ensemble of the packets of the multipoint packet flow PF received at the input measurement point(s) of the cluster is the same as the ensemble of the packets of the multipoint packet flow PF received at the output measurement point(s) of the cluster, if no packet loss occurs.

The management server MS may identify several clusters of different sizes, for example by applying the algorithm described by WO 2017/186302 in the name of the same Applicant. However, it may be appreciated that the measurement points MP0, MP1, MP2, MP3, . . . MPK themselves form a cluster, whose unique input measurement point is MP0 and whose output measurement points are MP1, MP2, MP3, . . . MPK. Indeed, since the multipoint packet flow PF has been defined as the aggregation of K point-to-point packet flows originating at the node N0 and addressed to the nodes N1, N2, N3, . . . NK, respectively, it is apparent that the ensemble of packets of the multipoint packet flow PF received at the input measurement point MP0 is the same as the ensemble of the packets of the multipoint packet flow PF received at the output measurement points MP1, MP2, MP3, . . . MPK, if no packet loss occurs.

Then, the management server MS may provide a cumulative performance measurement based on the cumulative performance parameters $CC(k)^A$, $CC(k)^B$ received from the measurement points MP0, MP1, MP2, MP3, . . . MPK of the cluster (step 401).

For example, if the cumulative performance parameters are counters $CC(k)^A$, $CC(k)^B$ counting the number of identified packets of the packet flow PF marked by MA and MB, at step 401 the management server MS may perform a cumulative packet loss measurement, namely a measurement of the number of packets of the multipoint packet flow PF as a whole which have been lost during transmission through the cluster. The cumulative packet loss $PL_{CUM}$ of the multipoint packet flow PF may be calculated for a marking period as:

$$PL_{CUM} = C_{CUM}^{in} - C_{CUM}^{out} \quad [1]$$

wherein:
(i) $C_{CUM}^{in}$ is the summation of the N counters provided by the N input measurement points of the cluster at the end of that marking period, and
(ii) $C_{CUM}^{out}$ is the summation of the M counters provided by the M output measurement points of the cluster at the end of that marking period.

In the exemplary scenario of FIG. 1, $C_{CUM}^{in}$ is equal to the counter provided by the unique input measurement point MP0 (namely, $CC(0)^A$ or $CC(0)^B$), while $C_{CUM}^{out}$ is equal to the summation of the counters provided by the K output measurement points MP1, MP2, MP3 . . . MPK of the cluster.

As another example, if the cumulative performance parameters are average timestamps $AT(k)^A$, $AT(k)^B$ indicating the average reception time of identified packets of the packet flow PF marked by MA and MB, at step 401 the management server MS may perform a cumulative time measurement, as described by WO 2017/186302 in the name of the same Applicant.

The cumulative performance measurements may be performed by the management server MS substantially in real time. This means that, as the management server MS receives from the measurement points MP0, MP1, MP2, MP3 . . . MPK the values of e.g. the counters $CC(k)^A$ (k=0, 1, 2, 3, . . . K) relating to a certain marking period, it may then perform a packet loss calculation for that marking period by applying the above equation [1] immediately, or anyway before it receives the counters $CC(k)^B$ (k=0, 1, 2, 3, . . . K) relating to the next marking period. This way, the management server MS can monitor the cumulative performance of the multipoint packet flow PF substantially in real time.

The cumulative packet loss measurements however provide an overall indication of the performance of the multipoint packet flow PF in the cluster as a whole. Hence, if a packet loss occurs during a marking period, the measurement of $PL_{CUM}$ does not provide any indication of the specific point-to-point packet flow PF1, PF2, PF3, . . . PFK in which the packet loss occurred.

According to an embodiment of the present invention, as far as the cumulative performance measurements provide positive results (step 402), the management server MS may continue to provide only such type of measurement.

If, at some point, the cumulative performance measurement results indicate a performance deterioration, the management server MS preferably provides point-to-point performance measurements relating to at least one of the K point-to-point packet flows comprised in the multipoint packet flow PF (step 403).

This in only exemplary. The point-to-point performance measurements may be performed off-line—namely at any time after reception of the cumulative performance parameters $CC(k)^A$, $CC(k)^B$ and the sample performance parameters SPPi(k) from the measurement points MP0, MP1, MP2, MP3 . . . MPK—and may be triggered by events of different types. For example, the network operator may decide to start a point-to-point performance measurement relating to a point-to-point packet flow carrying a certain service (e.g. voice service) following a complaint from a client who has detected a deterioration in his QoS.

Figure 5:
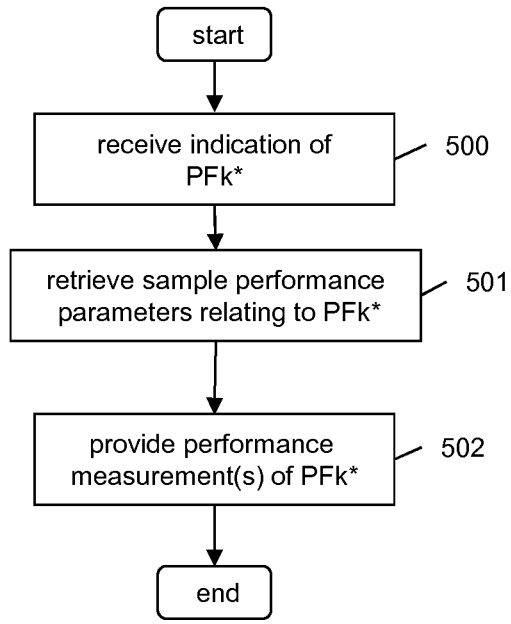
FIG. 5 is a flow chart showing in further detail one of the steps of the flow chart of FIG. 4, according to an embodiment of the present invention.

The flow chart of FIG. 5 shows in greater detail step 403 of performing a point-to-point performance measurement on at least one of the K point-to-point packet flows comprised in the multipoint packet flow PF, according to an embodiment of the present invention. First of all, the management server MS shall be provided with an indication of the point-to-point packet flow PFk* (with k* equal to any of 1, 2, 3, . . . K) to be subjected to the point-to-point performance measurement (step 500).

The point-to-point packet flow PFk* is defined (and hence distinguishable from the other point-to-point packet flows comprised in the multipoint packet flow PF) by the value(s) of one or more identification fields other than the one(s) used at step 301 for identifying the packets of the multipoint packet flow PF. Hence, at step 500 the management server MS basically receives (for example, from the network operator) the value(s) of the one or more identification fields that define the point-to-point packet flow PFk* to be subjected to the point-to-point performance measurement.

For example, if the multipoint packet flow PF is defined by a value of the Source Address field (namely, the IP address of the node N0, in the exemplary scenario of FIG. 1), then the point-to-point packet flow PFk* may be defined by a particular value of the Destination Address field (namely, the IP address of the node Nk*, in the exemplary scenario of FIG. 1).

This is a very simple, non limiting example. More generally, the point-to-point packet flow PFk* to be subjected to point-to-point measurement may be defined based on the value(s) of any field(s) comprised in the portion of packet's content PCi(k) that accompanies each sample performance parameter SPPi(k) sent by each measurement point MPk (k=0, 1, 2, 3 . . . K) to the management server MS (see step 304 in FIG. 3 and related description above).

Then, at step 501, the management server MS preferably retrieves from the database DB, amongst all the sample performance parameters SPPi(k) relating to the packet flow PF which have been received from the input and output measurement points of the cluster, those that relate to sample packets of the packet flow PFk* (step 501).

For this purpose, at step 501 the management server MS preferably reads in the database DB the portion of packet's content PCi(k) that accompanies each sample performance parameter SPPi(k) sent by each measurement point MPk and, if it comprises the value(s) of the one or more identification fields that define the point-to-point packet flow PFk*, then it retrieves the corresponding sample performance parameter SPPi(k). With reference to the scenario of FIG. 1, for example, application of step 501 provides a number of sample timestamps STi(0) provided by the measurement point MP0 for the sample packets of the packet flow PFk* and a number of sample timestamps STj(k*) provided by the measurement point MPk* for the same sample packets (if no packet losses occurred). If the one or more identification fields that define the point-to-point packet flow PFk* are comprised in the packet's payload (as described above, this situation may occur when the packets of the multipoint packet flow PF are formatted according to several stacked protocols), the management server MS preferably reads them by applying a deep packet inspection technique.

Preferably, together with the sample performance parameter SPPi(k), at step 501 the management server MS also retrieves from the database DB other information accompanying the sample performance parameter, in particular an identifier of the sample packet (for example, the sampling signature SS of the sample packet as calculated at step 303 or, at least, the unused hash of the sampling signature SS, namely the least significant $S_{max}$-S bits of the sampling signature SS which have not be used for selecting the sample packets at step 303), the identifier of the measurement point Mk that provided the sample performance parameter SPPi(k) and the identifier of the marking period Tm during which the sample packet has been identified.

Then, the management server MS may perform sample performance measurements on the sample packets of the packet flow PFk*, based on the sample performance parameters relating to the packet flow PFk* as provided by strep 501.

For example, with reference to the scenario of FIG. 1, sample time measurements may be provided, based on the sample timestamps STi(0) provided by the measurement point MP0 and the sample timestamps STj(k*) provided by the measurement point MPk*. In particular, the management server MS may perform individual time measurements on each sample packet of the packet flow PFk*. For instance, at step 502 the management server MS may calculate a one-way delay OWDi from the node N0 to the node Nk* for each sample packet of PFk* by applying the following equation:

$$OWDi = STj(k^*) - STi(0) \qquad [2]$$

with i and j are sample indexes which indicate the same sample packet as identified by the measurement point MP0 and by the measurement point MPk*, respectively.

Preferably, in order to identify sample timestamps provided by different measurement points for the same sample packet, the management server MS may use the unused hash of the sampling signature SS calculated for the sample packet that, as described above, is sent to the management server MS and stored in the database DB together with the sample performance parameter SPPi(k) relating to each sample packets. For this purpose, the technique described by WO 2018/072828 in the name of the same Applicant may be used.

In addition or alternatively to time measurements relating to the sample packets of the point-to-point packet flow PFk*, packet loss measurements may also be done. Differently from the cumulative packet loss measurements that may be performed at step 401, however, the packet loss measurements relating to the point-to-point packet flow PFk* are statistical, namely they are calculated on the sample packets only, and not on all the packets of the point-to-point packet flow PFk*.

Therefore, advantageously, by processing the content portions CPi(k) of the sample packets received from the measurement points MP1, MP2, MP3, ... MPK (by way of non limiting example, the headers of the sample packets), the management server MS may, at any time, provide for example an off-line or a posteriori performance measurement on the sample packets of anyone of the K point-to-point packet flows PF1, PF2, PF3, ... PFK comprised in the multipoint packet flow PF. Having at its disposal the content portions CPi(k) of the sample packets, indeed, the management server MS may apply an off-line filtering based on one or more fields of the portion of packet's content CPi(k), thereby extrapolating—amongst all the sample performance parameters SPPi(k) relating to the sample packets of the multipoint packet flow PF—only those that relate to a specific point-to-point packet flow comprised in the multipoint packet flow PF.

Such off-line filtering may be done for every one of the packet sub-flows (namely, the K point-to-point packet flows PF1, PF2, PF3 ... PFK in the described exemplary scenario) forming the multipoint packet flow PF, by suitably changing the filtering criteria. The granularity of the point-to-point analysis may be the desired one, provided the portion of packet's content CPi(k) comprises the information needed for providing a suitable filter. In a scenario where several services carried by respective point-to-point packet flows are present, for example, the network operator is advantageously provided with the capability of obtaining separate performance measurements for each one of the services provided, with the desired granularity.

In this respect, it shall be noticed that use of the hash sampling signature SS in combination with the properties of the cluster guarantees that a sample packet identified by any input measurement point of the cluster is received and correctly identified as sample packet also at an output measurement point of the cluster, and then that the performance parameters provided to the management server are consistent with each other. The management server MS therefore has at its disposal a database DB of commensurable and consistent sample performance parameters SPPi(k), which the management server MS may subject to off-line filtering as described above for extrapolating the performance measurement for any desired point-to-point packet flow PF1, PF2, PF3, ... PFK.

Furthermore, advantageously, no complex and costly filters have to be implemented at the measurement points MP0, MP1, MP2, MP3, ... MPK of the communication network CN. The measurement points MP0, MP1, MP2, MP3, ... MPK indeed cumulatively identify the packets forming the multipoint packet flow PF, which is done at step 301 using a very simple filter, e.g. based on a single field of the packet's header H. The more complex filters allowing identification of the sample performance parameters SPPi(k) relating to sample packets of any desired packet sub-flow are instead applied by the management server MS, which therefore has in charge most of the computational effort needed to identify the single packet sub-flows.

Even though reference has been made above to off-line or a posteriori processing of the sample performance parameters SPPi(k), such processing may be performed also in near-real time, namely immediately after reception of the sample performance parameters SPPi(k) at the management server MS, so as to provide near-real time measurements on the desired sub-flows.

According to other variants, the management server MS may gather from the various measurement points the sample performance parameters on the multipoint packet flow PF with the related information as described above and just store them in the database DB. Then, at any time, the management server MS may use the stored data for providing statistical analyses of the multipoint packet flow PF, not only from the performance point of view, but also from other points of view such as tracking the various packet sub-flows, determining the composition of the multipoint packet flow PF as far as the type of carried services (e.g. video, calls, etc.) is concerned and so on.

Further, for the purposes of the present invention, it shall be noticed that associating to each sample performance parameters SPPi(k) the respective portion of the sample packet's content PCi(k) and send them to the management server MS is considered equivalent to associating to each sample performance parameters SPPi(k) data which are obtained by applying a bijective function to the sample packet's content PCi(k) and send these data to the management server MS.

The invention claimed is:

1. A method for performing a performance measurement in a communication network, said method comprising, at each measurement point (MPk) of a number of measurement points implemented in said communication network:
 a) identifying packets of a multipoint packet flow;
 b) amongst said identified packets of said multipoint packet flow, selecting a number of sample packets, said selecting being based on the value of a sampling signature calculated by applying a hash function to a predetermined mask of bits in each identified packet;
 c) for each sample packet, providing to a management server a sample performance parameter and at least a portion of the packet's content;
 said method further comprising, at said management server:
 d) amongst said number of measurement points, identifying a cluster of measurement points wherein, if no packet loss occurs, each identified packet of said multipoint packet flow received by an input measurement point (MP0) of said cluster is also received at an output measurement point of said cluster;
 e) amongst the sample performance parameters provided by the measurement points of the cluster, identifying sample performance parameters relating to sample packets belonging to a packet sub-flow comprised in said multipoint packet flow, based on said at least a portion of said packet's content; and f) performing said performance measurement on said packet sub-flow, based on said identified sample performance parameters.

2. The method according to claim 1, wherein said packets of said multipoint packet flow are marked before they are injected in said communication network, said marking comprising setting the value of a marking field comprised in each packet of said multipoint packet flow- to one of at least two alternative marking values and cyclically switching said value of said marking field with a marking period Tm.

3. The method according to claim 1, wherein at step c) said at least a portion of the packet's content comprises at least a portion of the packet's header comprising at least one identification field of said packet sub-flow, other than one or more identification fields used at step a) for identifying said multipoint packet flow.

4. The method according to claim 1, wherein at step c) said at least a portion of the packet's content comprises at least a portion of the packet's payload comprising at least one identification field of said packet sub-flow, other than one or more identification fields used at step a) for identifying said multipoint packet flow.

5. The method according to claim 1, wherein it further comprises, upon reception of said sample performance parameter and said at least a portion of the packet's content at said management server, storing said sample performance parameter and said at least a portion of the packet's content in a database.

6. The method according to claim 5, wherein steps d), e) and f) are performed off-line after said storing, upon occurrence of an event detected by said management server.

7. The method according to claim 5, wherein at step e) said identifying said sample performance parameters relating to sample packets belonging to said packet sub-flow comprises:

determining at least one identification field comprised in said at least a portion of the packet's content whose value identifies said packet sub-flow;

reading in said database the at least a portion of packet's content that accompanies each stored sample performance parameter and, if it comprises said value identifying said packet sub-flow in said at least one identification field, retrieving the corresponding sample performance parameter from said database.

8. The method according to claim 1, wherein:

step c) comprises, for each sample packet, providing to said management server also an identifier of said sample packet; and step f) comprises, based on said identifiers, identifying sample performance parameters relating to a same sample packet and provided by different measurement points of said cluster.

9. The method according to claim 1, wherein it further comprises, after step a), updating a cumulative performance parameter indicative of the behaviour of the multipoint packet flow as a whole and wherein step f) comprises also providing a cumulative performance measurement based on said cumulative performance parameters received from the measurement points of said cluster.

10. The method according to claim 9, wherein said cumulative performance measurement are performed by said management server substantially in real time.

11. A system for performing a performance measurement in a communication network, said system comprising a number of measurement points implemented in said communication network and a management server, wherein each measurement point is configured to:

a) identify packets of a multipoint packet flow;

b) amongst said identified packets of said multipoint packet flow, select a number of sample packets, said selecting being based on the value of a sampling signature calculated by applying a hash function to a predetermined mask of bits in each identified packet;

c) for each sample packet, provide to said management server a sample performance parameter and at least a portion of the packet's content;

and wherein said management server is configured to:

d) amongst said number of measurement points, identify a cluster of measurement points wherein, if no packet loss occurs, each identified packet of said multipoint packet flow received by an input measurement point of said cluster is also received at an output measurement point of said cluster;

e) amongst the sample performance parameters provided by the measurement points of the cluster, identify sample performance parameters relating to sample packets belonging to a packet sub-flow comprised in said multipoint packet flow, based on said at least a portion of said packet's content; and f) perform said performance measurement on said packet sub-flow, based on said identified sample performance parameters.

* * * * *